(12) United States Patent
Razvi et al.

(10) Patent No.: US 8,935,667 B2
(45) Date of Patent: Jan. 13, 2015

(54) SYNCHRONIZATION OF PROSPECT INFORMATION BETWEEN SOFTWARE PROVIDERS AND RESALE PARTNERS

(75) Inventors: Nadim Razvi, Speyer (DE); Marco Sachs, St. Leon-Rot (DE)

(73) Assignee: SAP SE, Walldorf (DE)

( * ) Notice: Subject to any disclaimer, the term of this patent is extended or adjusted under 35 U.S.C. 154(b) by 204 days.

(21) Appl. No.: 13/333,624

(22) Filed: Dec. 21, 2011

(65) Prior Publication Data

US 2013/0167117 A1    Jun. 27, 2013

(51) Int. Cl.
*G06F 9/44* (2006.01)
(52) U.S. Cl.
USPC .......................... 717/121; 717/103; 715/962
(58) Field of Classification Search
None
See application file for complete search history.

(56) References Cited

U.S. PATENT DOCUMENTS

| 7,653,661 | B2 | 1/2010 | Razvi et al. | |
| 7,996,225 | B2* | 8/2011 | Schmid et al. | 704/260 |
| 7,996,255 | B1* | 8/2011 | Shenoy et al. | 705/7.31 |
| 8,332,806 | B2* | 12/2012 | Patrascu et al. | 717/100 |
| 2006/0235778 | A1 | 10/2006 | Razvi et al. | |
| 2008/0276234 | A1* | 11/2008 | Taylor et al. | 717/177 |
| 2012/0030069 | A1* | 2/2012 | Garg et al. | 705/27.1 |

OTHER PUBLICATIONS

"*Buying Center*," SAP Library—mySAP Customer Relationship Management) [online], <http://help.sap.com/saphelp_crm40/helpdata/en/3b/9fe3c24f7011d5975300a0c9306794/frameset.htm>, retrieved Dec. 21, 2011, 3 pages.

* cited by examiner

*Primary Examiner* — Don Wong
*Assistant Examiner* — Deric Ortiz
(74) *Attorney, Agent, or Firm* — Fish & Richardson P.C.

(57) ABSTRACT

The present disclosure describes methods, systems, and computer program products for synchronizing opportunity information in a software-related sales environment. One method includes identifying, at a software configuration application, a first set of opportunity information from a software reseller and a second set of opportunity information from a software provider, where the first and second set of opportunity information associated with a prospective software customer. The method further includes integrating the first and second set of opportunity information into a combined set of opportunity information within the software configuration application and identifying at least one modification to the combined set of opportunity information. The method then provides the at least one identified modification to the combined set of opportunity information to the software reseller and the software provider to synchronize the first and second sets of opportunity information.

15 Claims, 5 Drawing Sheets

SYNCHRONIZATION OF PROSPECT INFORMATION BETWEEN SOFTWARE PROVIDERS AND RESALE PARTNERS

RELATED APPLICATIONS

This application is related to U.S. application Ser. No. 13/333,621, titled "PERSONALIZED DEMO ENVIRONMENT BASED ON SOFTWARE CONFIGURATION INFORMATION," filed Dec. 21, 2011, and fully incorporating the contents therein.

TECHNICAL FIELD

The present disclosure relates to software, computer systems, and computer-implemented methods for synchronizing prospective customer information between systems.

BACKGROUND

Pre-sales software configuration systems can provide sales and configuration tools used in pre-sales situations by software providers, as well as their partners and resellers. The pre-sales software configuration systems can provide prospective customers with the ability to initially scope a possible software system with the assistance of a sales agent or representative of the software provider and/or a representative of a particular partner or reseller. The scoping of a particular software application or suite can be presented to the prospective customer, providing an illustration of a project plan for implementing the application or suite, as well as information related to the projected cost estimate of implementing some or all of the solution.

In cloud computing solutions, resources, services, enhanced functionality, or software can be provided to a client computer or other systems across a network. Cloud computing models can also be used to provide shared access and remote storage of data to users. In cloud computing solutions, computing resources are provided as hosted services across a network such as the Internet. These services can include on-demand services that are provided through a cloud computing network without installation of applications or software on a client computer.

SUMMARY

The present disclosure describes methods, systems, and computer program products for synchronizing opportunity information in a software-related sales environment. One method includes identifying, at a software configuration application, a first set of opportunity information from a software reseller and a second set of opportunity information from a software provider, where the first and second set of opportunity information associated with a prospective software customer. The method further includes integrating the first and second set of opportunity information into a combined set of opportunity information within the software configuration application and identifying at least one modification to the combined set of opportunity information. The method then provides the at least one identified modification to the combined set of opportunity information to the software reseller and the software provider to synchronize the first and second sets of opportunity information.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This disclosure generally relates to software, computer systems, and computer-implemented methods for synchronizing opportunity and prospect information between a pre-sales software configuration system, software provider, and a partner of the software provider, as well as a system capable of providing personalized demos of software solutions configured in the pre-sales software configuration system. Specifically, interfaces and communications between the pre-sales software configuration system, software provider, and the partner allow for information to be shared amongst the described systems, providing for more robust sharing and synchronizing of information associated with potential customers and sales targets, while at the same time allowing personalized demos to be provided based on the synchronized information between the systems and scoping information provided within the pre-sales software configuration system.

With regard to the synchronization, whenever a new prospective customer is identified within the pre-sales software configuration system, a customer relationship management (CRM) system of the software provider, or a CRM system associated with the partner or reseller of the software provider, a record of that prospective customer is created representing a sales opportunity for the software provider and/or the partner. In some instances, the partner may also be a customer of the product being sold by the software provider. A corresponding opportunity object or entry associated with the prospective customer can be created in some or all of the relevant systems. In some instances, each system may include or define a subset of the total information associated with the prospective customer and overall opportunity, such that each system fails to provide a complete view of the opportunity and the available information related to the prospective customer. The described tools provide an interface between the pre-sales software configuration system, the CRM system of the software provider, and/or the CRM system of the partner to allow each component of the pre-sales environment to obtain a full, or more complete, set of information associated with the opportunity and prospective customer. The interfaces between the systems can be implemented in various suitable options, including, but not limited to, remote function calls (RFCs), XML uploads and downloads, and web services. Due to the interface and integration of information within the pre-sales software configuration system, the partner, and the software provider, sales efforts and the likelihood of errors by the partners and the software provider can be reduced, while the speed of the sales process can be increased for partners, the software provider, and customers.

The described solution also can provide a personalized demo of the software as configured in the pre-sales software configuration system. Previously, the prospective customer and the sales representative (whether at the reseller or the software provider), was unable to use the pre-sales software configuration system to provide demonstrations of particular scoped solutions created in the pre-sales software configuration system. The present disclosure provides tools for using the set of configuration information and data, along with information associated with the particular opportunity and prospective customer, to create a personalized demo with the partner's system or the provider's system (as appropriate), allowing the prospective customer to view and interact with a demo of the configured system prior to purchasing. The system can incorporate, in some instances, the synchronized information from across the involved systems, to provide example data for use in the personalized demo. In particular, the personalized demo may be capable of modification while in use, where those modifications modify the appropriate configuration information within the pre-sales software configuration system. Interfaces between the pre-sales configuration system and the demo environments of the software provider and/or the partner systems are provided, allowing for information to be shared and used in generating the personalized demos.

Figure 1:
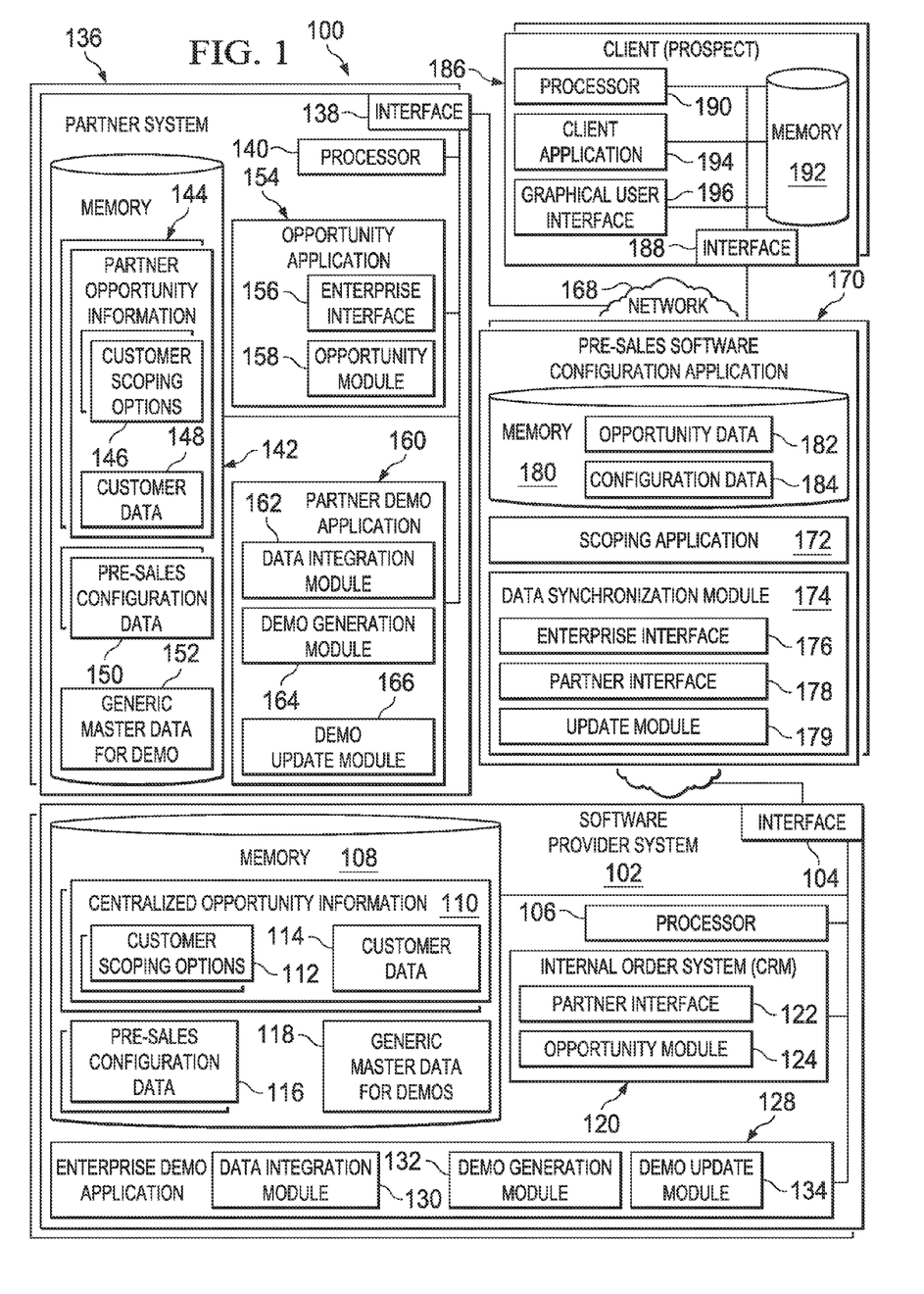
FIG. 1 illustrates an example environment for implementing various features of a system capable of synchronizing opportunity information between a pre-sales software configuration system, software provider, and a partner of the software provider, as well as a system capable of providing personalized demos of software solutions configured in the pre-sales software configuration system.

FIG. 1 illustrates an example environment 100 for implementing various features of a system capable of synchronizing opportunity information between a pre-sales software configuration system, software provider, and a partner of the software provider, as well as a system capable of providing personalized demos of software solutions configured in the pre-sales software configuration system. The illustrated environment 100 includes, or is communicably coupled with, a software provider system 102, a partner system 136, a pre-sales software configuration system or instance 170, and one or more clients 186. At least some of the communication between the illustrated systems, including between the software provider system 102, partner system 136, one or more clients 186, and the pre-sales software configuration system 170 may be performed across or via network 168. In general, environment 100 depicts an example configuration of a system for integrating information between the various systems in a software sales environment, allowing for additional flexibility, better sales experiences, and sharing of information between the illustrated systems, including for generating personalized demos based on information available in one or more of the illustrated systems.

As illustrated in environment 100, the pre-sales software configuration system 170 is a cloud-based system, generally hosted or made available by the software provider. The pre-sales software system 170 can be used to scope software solutions from the software provider, which may be enterprise resource planning (ERP) applications containing modular portions and numerous options for particular implementations of the corresponding application. The software solutions can be provided directly by the software provider and its associated sales representatives or agents, as well as indirectly through one or more partners of the software provider. The partners, associated with one or more partner systems 136, can assist in reselling and implementing solutions and customer-specific implementations of software offered by the software provider. The scoping and configuration of those solutions can be defined using the pre-sales software configuration system 170, with a particular instance of the pre-sales software configuration system 170 being provided for each partner system 136 and/or for each customer of the partner systems 136. Once the scoping process has been performed, both the software provider system 102 and the partner system 136 include components, modules, and other software and hardware suitable for providing personalized demos for potential customers, using information provided by the scoping and configuration operations at the pre-sales software configuration system 170.

Environment 100 includes multiple clients 186, where each client 186 may represent a business, technical, or administrative user or group of users interacting or working with the various systems. Some clients 186 may represent prospective customers interacting with sales agents of the partner system 136 or software provider system 102, other clients 186 may be employees of either the partner system 136 or software provider system 102 interacting with the pre-sales software configuration system 170, while still other clients 186 may be system or business administrators of various portions of the illustrated environment 100.

Environment 100 is an example, and in alternative implementations, the elements illustrated in FIG. 1 may be included in or associated with different and/or additional servers, clients, networks, and locations other than those as shown. For example, one or more of the components illustrated within the pre-sales software configuration system 170 may be located in multiple or different servers, cloud-based networks, or other locations accessible to at least some of the other illustrated systems (e.g., either directly or indirectly via network 168).

In general, the software provider system 102 is any server or set of servers that store and execute various operations for selling and providing software applications for sale and/or licensing to customers. As illustrated in FIG. 1, the software provider system 102 can include multiple components, with this instance of the software provider system 102 including an internal order system 120 and an enterprise demo application 128. The software provider system 102 may be a Java™ 2 Platform, Enterprise Edition (J2EE)®-compliant application server or servers that includes Java™ technologies such as Enterprise JavaBeans® (EJB), J2EE® Connector Architecture (JCA), Java™ Messaging Service (JMS), Java™ Naming and Directory Interface (JNDI), and Java™ Database Connectivity (JDBC). The software provider system 102 may store or be associated with a plurality of various other applications, including applications not shown in FIG. 1. In other instances, the software provider system 102 may be a dedicated system for sales purposes, including the components illustrated in FIG. 1 (or a subset thereof) and their related functionality. In some instances, at least a portion of the software provider system 102 may comprise one or more web servers or be communicably coupled with a web server, where one or more of the applications associated with the software provider system 102 represent web-based (or web-accessible) applications accessed and executed through requests and interactions received from other components within environment 100, like clients 186, a particular pre-sales software configuration system 170, or one or more partner systems 136, as well as a remote portion of the software provider system 102, where appropriate. In some instances, the software provider system 102 may be separated into multiple servers, systems, environments, and locations. The software provider system 102 may also be, or include, enterprise applications providing end-to-end solutions for businesses, such as an ERP system combining CRM, supply-chain management (SCM), and other suitable components.

At a high level, the software provider system 102 comprises one or more electronic computing devices operable to receive, transmit, process, store, or manage data and information associated with the environment 100. The software provider system 102 illustrated in FIG. 1 can be responsible for receiving application requests from one or more components illustrated in FIG. 1, responding to the received requests by processing said requests in the associated internal order system 120 or enterprise demo system 128 (as well as others), and sending the appropriate responses from the software provider system 102 back to the requesting component or other requesting system. The software provider system 102 and its components can also process and respond to local requests from a user locally accessing the system 102. Accordingly, requests associated with the software provider system 102 may also be sent from internal users or components, external or third-party customers, and other associated business applications or business processes, as well as any other appropriate entities, individuals, systems, or computers. The software provider system 102 may be in communication with the pre-sales software configuration system 170, the partner system 136, and one or more clients 186, such that the operations for defining, scoping, configuring, and demoing applications offered by the software provider can be performed. In some instances, at least a portion of the applications and functionality performed by the software provider system 102 may include a web-based application executing functionality associated with a networked or cloud-based business process or operations.

As used in the present disclosure, the term "computer" is intended to encompass any suitable processing device. For example, although FIG. 1 illustrates a single software provider system 102, environment 100 can be implemented using any number of composite application servers, as well as computers other than servers, including a server pool. Indeed, the software provider system 102 may be any computer or processing device such as, for example, a blade server, general-purpose personal computer (PC), Macintosh®, workstation, UNIX-based workstation, or any other suitable device. In other words, the present disclosure contemplates computers other than general purpose computers, as well as computers without conventional operating systems. Further, the illustrated software provider system 102 may be adapted to execute any operating system, including Linux, UNIX, Windows, Mac OS®, or any other suitable operating system.

In the illustrated implementation of FIG. 1, the service provider system 102 includes an interface 104, a processor 106, a memory 108, an internal order system 120, and an enterprise demo system 128. In some instances, the service provider system 102 and its illustrated components may be separated into multiple components executing at different servers and/or systems. Thus, while illustrated as a single component in the example environment 100 of FIG. 1, alternative implementations may illustrate the service provider system 102 as comprising multiple parts or portions accordingly.

FIG. 1 depicts a server-client environment, as well as integrated cloud computing-related elements. Various other implementations of the illustrated environment 100 can be provided to allow for increased flexibility in the underlying system, including multiple servers and systems creating the software provider system 102 and performing or executing one or more additional or alternative instances of the applications and operations associated with or related to the system's components, including those illustrated as included as part of the internal order system 120 and/or the enterprise demo application 128. In those instances, the different software provider systems 102 may communicate with each other via a cloud-based network or through the connections provided by network 168.

The interface 104 is used by the software provider system 102 to communicate with other systems in a client-server, cloud computer, or other distributed environment (including within environment 100) connected to the network 168 (e.g., one of the clients 186, as well as other systems communicably coupled to the network 168). The interface 104 generally comprises logic encoded in software and/or hardware in a suitable combination and operable to communicate with the network 168. More specifically, the interface 104 may comprise software supporting one or more communication protocols associated with communications such that the network 168 or the interface's hardware is operable to communicate physical signals within and outside of the illustrated environment 100.

Generally, the software provider system 102 may be communicably coupled with a network 168 that facilitates wireless or wireline communications between the components of the environment 100 (i.e., between the software provider system 102, the partner systems 146, the pre-sales configuration system 170, and/or the one or more clients 186), as well as with any other local or remote computer, such as additional clients, servers, or other devices communicably coupled to network 168, including those not illustrated in FIG. 1. In the illustrated environment, the network 168 is depicted as a single network, but may be comprised of more than one network without departing from the scope of this disclosure, so long as at least a portion of the network 168 may facilitate communications between senders and recipients. In some instances, one or more of the components associated with the system may be included within the network 168 as one or more cloud-based services or operations. In FIG. 1, the pre-sales software configuration application 170 is provided as a cloud-based and/or cloud-enabled application within network 168.

The network 168 may be all or a portion of an enterprise or secured network, while in another instance, at least a portion of the network 168 may represent a connection to the Internet. In some instances, a portion of the network 168 may include a portion of a cellular or mobile data network or other network capable of relaying short message service (SMS) or multimedia messaging service (MMS) messages, as well as other suitable mobile data messaging. In some instances, a portion of the network 168 may be a virtual private network (VPN). Further, all or a portion of the network 168 can comprise either a wireline or wireless link. Example wireless links may include 802.11a/b/g/n, 802.20, WiMax, 3G, 4G (i.e., LTE), and/or any other appropriate wireless link. In other words, the network 168 encompasses any internal or external network, networks, sub-network, or combination thereof operable to facilitate communications between various computing components inside and outside the illustrated environment 100. The network 168 may communicate, for example, Internet Protocol (IP) packets, Frame Relay frames, Asynchronous Transfer Mode (ATM) cells, voice, video, data, and other suitable information between network addresses. The network 168 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the software provider system 102 includes a processor 106. Although illustrated as a single processor 106 in the software provider system 102, two or more processors may be used in the software provider system 102 according to particular needs, desires, or particular embodiments of environment 100, for instance, when the software provider system 102 includes a plurality of servers or other computers. The processor 106 may be a central processing unit (CPU), a blade, an application specific integrated circuit (ASIC), a field-programmable gate array (FPGA), or another suitable component. Generally, the processor 106 executes instructions and manipulates data to perform the operations of the software provider system 102 and, specifically, the functionality associated with the corresponding internal order system 120 and enterprise demo application 128, as well as any other applications executing within the software provider system 102, such as an enterprise business application (e.g., an ERP application). In one implementation, the processor 106 executes the functionality required to receive and respond to requests and instructions from the partner system 136, pre-sales software configuration application 170, and clients 186, and any other internal functionality of the software provider system 102, among others.

Regardless of the particular implementation, "software" may include computer-readable instructions, firmware, wired or programmed hardware, or any combination thereof on a non-transitory medium operable when executed to perform at least the processes and operations described herein. Indeed, each software component may be fully or partially written or described in any appropriate computer language including C, C++, Java™, Visual Basic, ABAP, assembler, Perl®, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, each processor 106 executes the corresponding internal order system 120 and enterprise demo application 128 stored on the associated software provider system 102. In some instances, a particular software provider system 102 may be associated with the execution of two or more instances of either the internal order system 120 and/or enterprise demo application 128, as well as one or more distributed applications executing across two or more servers associated with the software provider system 102.

At a high level, the internal order system 120 and the enterprise demo application 128 are any applications, programs, modules, processes, or other software that may execute, change, delete, generate, or otherwise manage information associated with a particular software provider system 102. Specifically, the internal order system 120 may be a CRM system with the software provider used to handle the collected opportunity information associated with one or more prospective customers. In some instances, the internal order system 120 may be used by sales representatives employed directly by the software provider selling the provider's available applications and systems. The internal order system 120 may be used to access information associated with one or more preferences, configuration information, and master data associated with different customers and their orders. In some instances, the internal order system 120 may be used create orders for applications and systems offered by the software provider based on information collected from the pre-sales software configuration application 170, used by both sales employees of the software provider and resale partners associated with the one or more partner systems 136. In other words, the internal order system 120 can be accessed by the partner system 136 through the pre-sales software configuration application 170, where appropriate, to initiate and finalize sales of the software provider's applications and systems based on configuration information provided by the prospective customer.

Figure 2:
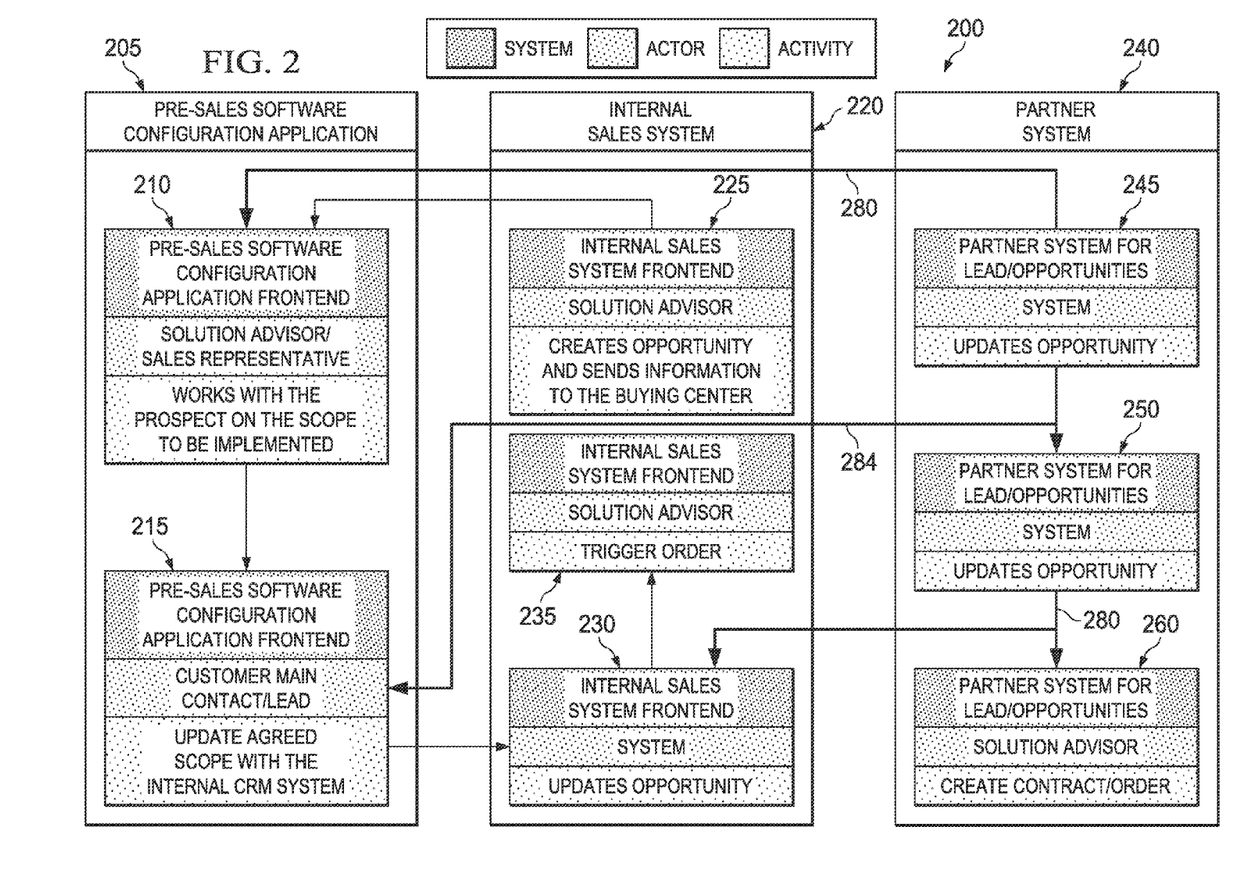
FIG. 2 is a diagram illustrating example actions, actors, and communications between systems within an example environment described in the present application, where the illustrated actions, actors, and communications assist in providing synchronized opportunity-related information between the pre-sales software configuration system, software provider, and a partner or reseller of the software.
Figure 3:
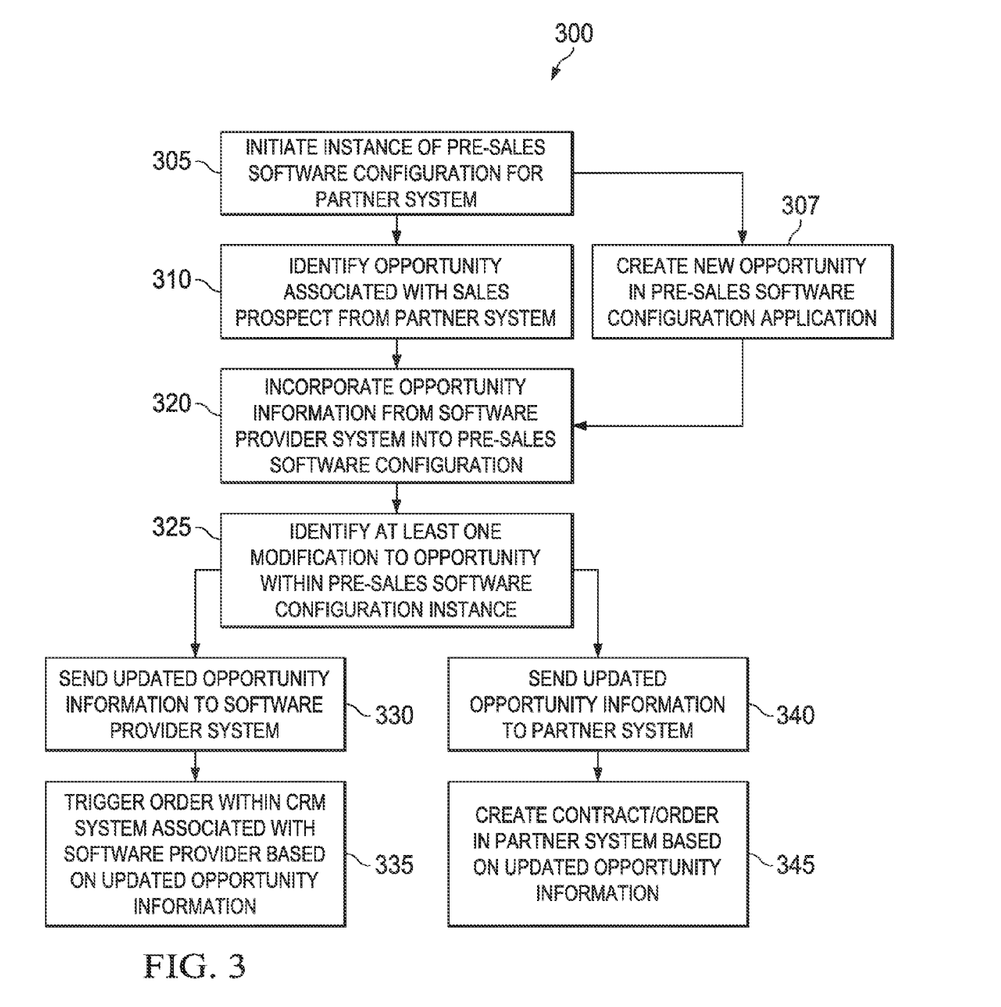
FIG. 3 is a flowchart of an example method for providing synchronized opportunity-related information between the pre-sales software configuration system, software provider, and a partner or reseller of the software.

The internal order system 120 is associated with a partner interface 122 and an opportunity module 124. The partner interface 122 provides an interface between the pre-sales software configuration application 170 and the software provider system 102, allowing information provided by the partner system 136 to be synchronized during the pre-sales process. Specifically, the partner interface 122 can represent, process, and exchange information associated with one or more opportunities to the pre-sales software configuration application 170, which can then exchange that information with the corresponding partner system 136 through its enterprise interface 156. FIGS. 2 and 3 provide additional information on the exchange of information between these systems.

As illustrated, the internal order system 120 further includes or is associated with an opportunity module 124. The opportunity module 124 can be used to modify, interact with, and to update opportunity information stored in memory 108. The opportunity information may be stored in a suitable data object, such as a business object. Business objects are representations of a type of a uniquely identifiable business entity (an object instance) described by a structural model. Processes operate on business objects. Specifically, a business object represents a specific view on some well-defined business content which a typical business user would expect and understand with little explanation. Business objects may be master data objects, or objects that encapsulate master data (i.e., data that is valid for a period of time). Each opportunity may be associated with a particular prospective customer, and can be associated or populated with information defining that prospective customer, including personal and business information, preferences, current configurations associated with one or more potential systems for purchase and including application scoping information provided via the pre-sales software configuration application 170, as well as other relevant data. The opportunity information can then be used by the pre-sales software configuration system 170, the software provider system 102, and/or the partner system 136 to identify and determine the appropriate applications and options to be suggested and provided to the prospective customer. In prior systems, one version of the opportunity information may be stored in the software provider system 102, while a second version of the opportunity information may be stored at the partner system 136. The partner interface 122 can allow the opportunity module 124 (and therefore the software provider system 102) to synchronize the opportunity information stored at the partner system 136, and vice versa, via the pre-sales software configuration application 170, where the information can be combined and provided to each system as appropriate.

Processor 106 also executes the enterprise demo application 128. The enterprise demo application 128 can provide functionality to the software provider system 102 allowing for personalized demos of configured systems to be generated within the software provider system 102 based on sets of configuration information defined within the pre-sales software configuration application 170. The enterprise demo application 128 can generate a demo environment as needed or requested by the pre-sales software configuration application 170. The enterprise demo application 128 includes a data integration module 130, a demo generation module 132, and a demo update module 134. The data integration module 130 can be used to identify, retrieve, and/or interpret configuration and scoping information defined within the pre-sales software configuration application 170, as well as opportunity information or data associated with the prospective customer for whom a particular demo is generated. In some instances, the enterprise demo application 128 can access a set of generic master data 118 that can be used for generating the demo, such as sample business data that can be used for demonstration purposes. In some instances, the enterprise demo application 128 can use at least a portion of the opportunity data 182 or information available at the pre-sales software configuration application 170, the software provider system 102, and/or the partner system 136 to provide demo information and data based, at least in part, on the actual data associated with the prospective customer to provide a more realistic demo presentation. The demo generation module 132 is used by the enterprise demo application 128 to provide a demo environment corresponding to the scoping information previously defined with the pre-sales software configuration application 170 by the customer or sales representative, providing an example demo environment meeting the configuration information defined during the pre-sales process. The generated demo environment may provide one or more configuration or modifiable elements, such as extensions to the demo environment to include additional or alternative functionality and operations, as well as options to remove unwanted or unnecessary functionality. When those elements are modified within the demo environment, the demo update module 134 can identify those updates, and subsequently provide information defining those modifications back to the pre-sales software configuration application 170. The corresponding configuration information associated with the current system being built/defined/scoped can be updated, such that the configuration information then reflects the one or more modified configuration and/or scoping options.

Memory 108 of the software provider system 102 stores data and program instructions. Memory 108 may include any memory or database module and may take the form of volatile or non-volatile memory including, without limitation, magnetic media, optical media, random access memory (RAM), read-only memory (ROM), removable media, or any other suitable local or remote memory component. Memory 108 may store various objects or data, including classes, frameworks, applications, backup data, business objects, jobs, web pages, web page templates, database tables, processes, process contexts, repositories storing services local to the software provider system 102, and any other appropriate information including any parameters, variables, algorithms, instructions, rules, constraints, or references thereto associated with the purposes of the software provider system 102 and the associated applications. In some implementations, including a cloud-based system, some or all of memory 108 may be stored remotely from the software provider system 102, and communicably coupled to the software provider system 102 (i.e., via network 168).

As illustrated, memory 108 includes sets of centralized opportunity information 110, pre-sales configuration data 116, and a set of generic master data 118 used with the demo application 128. The centralized opportunity information 110 may include any opportunity data stored at or referenced by the software provider system 102, and can include the opportunity data and information used by the internal order system 120. The opportunity information 110 can include customer scoping options and information 112 defined in previous solutions, as well as in-process solutions being defined at the pre-sale software configuration application 170. The customer data 114 can include master data relating to a particular prospective customer, and can include customer information, addresses, preferences, demographic information, and other relevant information. The pre-sales configuration data 116 may be data defined within the pre-sale software configuration application 170, and may be used, for example, in generating an appropriate demo environment or presentation. The pre-sales configuration data 116 may be temporary data stored in memory 108 when a request for demo generation is received. In some instances, the customer scoping options 112 may be used to provide information related to demo generation. The generic master data 118 can provide generic data for populating one or more fields, entries, or other information included within the demo environment. The generic master data can be used to provide a realistic data set associated with the demo version of the scoped or configured application, without requiring sensitive or private information to be included in the personalized demo.

The partner systems 136 provide systems associated with partners external to the software provider and the software provider system 102 engaging in reselling of the software products sold by the software provider. Partner systems 136 may further be executing the same software being resold, such as an ERP or CRM system being sold to one or more prospective customers. In some instances, those partners may be engaged in the business of combining one or more software products available from the software provider (or from multiple software providers) to provide complete or enhanced solutions to customers. The software providers may encourage the partners by providing various tools and systems to assist in the reselling of the software provider's products, one such tool being the pre-sales software configuration application 170. In general, each partner system 136 comprises an electronic computing device operable to receive, transmit, process, store, or manage data and information associated with the environment 100, and specifically, for reselling software and applications associated with the software provider using the pre-sales software configuration application 170. The partner systems 136 can be similar in some aspects to the software provider system 102, in that each partner system 136 can store local versions of opportunity information 144, provide tools to interact with the partner opportunity information 144 (such as the opportunity application 154), provide an interface to the pre-sales software configuration application 170 and the software provider system's information (i.e., the enterprise interface 156), and a partner demo application 160 for providing personalized demos within the partner system 136 itself, where appropriate. To perform these operations, the partner systems 136 each include an interface 138, a processor 140, memory 142, an opportunity application 154, and a partner demo application 160.

The interface 138 and the processor 140 may be similar or different than the interface 104 and processor 106 of the software provider system 102. The interface 138 generally allows the partner system 136 to communicate with network 168 and/or the other external systems. The processor 140 generally executes the opportunity application 154 and the partner demo application 160 and other functionality and/or components associated with or included within the partner system 136.

The opportunity application 154 may be an ERP or CRM application (or a portion thereof) used to interact with one or more prospective customers for reselling software systems from the software provider. The opportunity application 154 can include the enterprise interface 156 that allows opportunity information 144 at the partner to be shared with the pre-sales software configuration application 170, and with the software provider system 102. The enterprise interface 156 and the opportunity module 158 may work in concert to identify and retrieve opportunity information from the software provider system 102 not present within the partner opportunity information 144, and then update and synchronize the partner opportunity information 144. The opportunity module 158 can perform operations and functionality associated with obtaining and updating opportunity information 144 associated with particular prospective customers.

The partner demo application 160 may be similar to the enterprise demo application 128, where the partner demo application 160 is executed at the partner system 136 (or another associated system outside the software provider system 102). The partner demo application 160 can identify, request, and/or receive configuration and scoping information from the pre-sales software configuration application 170, and use that information to generate a demo environment corresponding to the scoping and configuration defined for a particular customer. The partner demo application 160 can include a data integration module 162, a demo generation module 164, and a demo update module 166, which may each be similar to or different than the corresponding components within the enterprise demo application 128 (elements 130, 132, and 134), and which can be used to identify the appropriate scoping information associated with the demo, generate the demo, and identify when options provided within the demo environment are modified, causing the configuration information to be modified within the pre-sales software configuration application 170.

Memory 142 of the partner system 136 stores data and program instructions related to the partner system 136. Memory 142 may be similar to or different from the particular implementation of memory 108 in the software provider system 102. Some or all of memory 142 may be stored remotely from the partner system 136. As illustrated, memory 142 can include a set of partner opportunity information 144 (including customer scoping options 146 and customer data 148), sales configuration data 150 associated with a demo to be generated, and a set of generic master data 152 to be used for populating a particular demo. Similar to the enterprise demo application 128, in some instances, some of the partner opportunity information 144 can be used to populate at least a portion of the data within the demo environment, which is itself built based on the sales configuration data 150 received/retrieved from the pre-sales software configuration application 170.

As previously noted, the pre-sales software configuration application 170 may be hosted or provided within a cloud computer solution within network 168. The pre-sales software configuration application 170 is a sales component that can be used to configure and plan projects for new or prospective customers, both by sales representatives internal to the software provider and those associated with a particular partner system 136. The pre-sales software configuration application 170 can be an on-demand solution, and can be hosted in some instances by the software provider system 102. In general, the pre-sales software configuration application 170 provides tools and applications for sales representatives and prospective customers to configure and scope software solutions provided by the software provider and others. In some instances, the operations associated with the scoping and configuration can be provided, for instance, by the scoping application 172. The scoping application 172 can be used to identify one or more applications to be scoped, and can determine the various options, configurations, and decisions to be made during the configuration and scoping process. In some instances, the various decisions to be made for a new solution may be presented within a user interface associated with the scoping application 172 and available at one or more graphical user interfaces (GUIs) associated with the various entities within environment 100, including GUIs associated with a particular client 186, partner system 136, or software provider system 102. The scoping application 172 and other portions of the pre-sales software configuration application 170 can be executed by one or more processors on various systems available to be used for cloud-based processing. In some instances, the scoping application 172 may be provided as a web service or web-accessible application. The scoping application 172 may include a demo module (not illustrated) capable of requesting and/or launching an appropriate demo application 128, 160. The appropriate demo application 128, 160 to be launched and which is to generate a demo of the scoped and configured system can be determined based on the sales representative's employment, the particular environment 100 and capabilities of the systems 102, 136 and their demo applications, a preference of the sales representative or customer, or other suitable criteria.

Specifically, the scoping application 172 and the pre-sales software configuration application 170, as cloud-based solutions, can represent software, data access, and storage services that do not require end user knowledge of the physical location and configuration of the system that delivers the services. The illustrated cloud-based solutions can be executed at a server hosted by the software provider system 102, as well as various other cloud-based locations based on dynamically scalable and virtualized resources. The cloud-based solutions may take the form of web-based tools or applications that users can access and use through a web browser as if the programs were installed locally on their own computers. The cloud-based solutions can be delivered via the internet, which are accessed from web browsers and desktop and mobile apps, while the software and data are stored on servers at a remote location (including both the partner system 136 and the software provider system 102 through one or more defined interfaces).

Associated with the scoping application 172 is the data synchronization module 174. The data synchronization module 174 can allow information to be shared between various systems containing data and information associated with various prospective customers and their corresponding opportunity objects (or other related stored information). As previously described, opportunity information associated with different prospective customers can be stored at both or either of the software provider system 102 and the partner system 136. The illustrated enterprise interface 176 and partner interface 178 allow opportunity information associated with prospective customers from the respective systems to be identified and stored local to or associated with the pre-sales software configuration application 170, and to be synchronized back to those systems. In some instances, the update module 179 may perform the update functionality, identifying when opportunity information has been modified and notifying the related partner system 136 (via the partner interface 178) and the software provider system 102. The update module 179 may synchronize the opportunity information when changes occur, at specific pre-determined and/or user-defined intervals, or in response to one or more triggering events or actions within the pre-sales software configuration application 170. In some instances, the update module 179 can send the updated opportunity information directly to the respective systems itself, while in others, the update module 179 can notify those systems of changes and allow the systems to retrieve the updated information at their own initiative or upon their request.

The pre-sales software configuration application 170 can be associated with a memory 180 storing collected information associated with the prospective customer and the current scoping and configuration data entered into the pre-sales application 170. The memory 180 can be stored at any suitable location within or communicably coupled to the network 168, and may be located remote to at least a portion of the pre-sales software configuration application 170. In general, memory 180 itself may be similar to or different than memory 108 and/or memory 142. As illustrated, memory 180 includes a set of opportunity data or information 182 and a set of configuration data 184. The set of opportunity data 182 may represent a collected and combined set of opportunity information from both the partner system 136 and the software provider system 102 as identified through the interfaces 176, 178. The data may be modified through use of the pre-sales software configuration application 170, or through updates received from either system. This opportunity data 182 can be used as the basis for the data synchronization in the related systems, and can be monitored, as appropriate, by the update module 179. The configuration data 184 may be data defined by the prospective customer and sales representative via the scoping application 172, as well as previous scoping information and data retrieved from the software provider system 102 and/or the partner system 136. The configuration data 184 can be used to generate a demo environment when the demo is requested, as well as to generate an order for a software solution when scoping is complete.

The illustrated environment 100 further includes one or more clients 186. Each client 186 may be associated with a prospective client, as well as the software provider system 102 and a particular partner system 136. In some instances, one or more of the clients 186 may be an administrator of one or more systems within environment 100. Each client 186 may be any computing device operable to connect to or communicate with at least one of the aforementioned components using a wireline or wireless connection, via the network 168, or another suitable communication means or channel.

In general, each client 186 includes a processor 190, an interface 188, a client application 194, a graphical user interface (GUI) 196, and a memory 192, among others. In general, the client 186 comprises an electronic computer device operable to receive, transmit, process, and store any appropriate data associated with the environment 100 of FIG. 1. It will be understood that there may be any number of clients 186 associated with, or external to, environment 100. For example, while illustrated environment 100 includes a single client 186, alternative implementations of environment 100 may include multiple clients 186 communicably coupled to the one or more of the systems illustrated. In some instances, one or more clients 186 may be associated with administrators of the environment, and may be capable of accessing and interacting with the settings and operations of the pre-sales software configuration application 170, the software provider system 102, and particular partner systems 136, and/or other components within the environment 100. Additionally, there may also be one or more additional clients 186 external to the illustrated portion of environment 100 capable of interacting with the environment 100 via the network 168. Further, the terms "client" and "user" may be used interchangeably as appropriate without departing from the scope of this disclosure. Moreover, while each client 186 is described in terms of being used by a single user, this disclosure contemplates that many users may use one computer, or that one user may use multiple computers.

The GUI 196 associated with each client 186 may comprise a graphical user interface operable to, for example, allow the user of a client 186 to interface with at least a portion of the pre-sales software configuration application 170, the software provider system 102, and/or particular partner systems 136, and their associated operations and functionality. Generally, the GUI 196 provides the particular user with an efficient and user-friendly presentation of business data provided by or communicated within the system. The GUI 196 may comprise a plurality of customizable frames or views having interactive fields, pull-down lists, and buttons operated by the user. For example, the GUI 196 may provide interactive elements that allow a user to interact with the pre-sales software configuration application 170, the software provider system 102, and/or particular partner systems 136, as well as other components within and/or external to environment 100. The different portions of the functionality may be presented and accessible to the user through the GUI 196, such as through a client application 194 (in some instances, a web browser). Generally, the GUI 196 may also provide general interactive elements that allow a user to access and utilize various services and functions of the various systems, applications, and modules within environment 100. In some instances, the client application 194 may be used to access various portions of different systems and applications, including the pre-sales software configuration application 170, the software provider system 102, and/or particular partner systems 136. In some instances, the client application 194 may be used to access (and the GUI 196 used to view) information retrieved from various memories 108, 142, 180, 192 to view relevant customer and pre-sales information. In some instances, the client application 194 may be an agent or client-side version of one or more of the illustrated components. Alternatively, the client application 194 may be used to interact with user input-related tasks associated with the pre-sales software configuration application 170. The GUI 196 may present the information of the client application 194 for viewing and interaction. In general, the GUI 196 is often configurable, supports a combination of tables and graphs (bar, line, pie, status dials, etc.), and is able to build real-time portals and visualizations of information, where tabs are delineated by key characteristics (e.g., site or micro-site). Therefore, the GUI 196 contemplates any suitable graphical user interface, such as a combination of a generic web browser, intelligent engine, and command line interface (CLI) that processes information in the platform and efficiently presents the results to the user visually.

As used in this disclosure, each client 186 is intended to encompass a personal computer, touch screen terminal, workstation, network computer, kiosk, wireless data port, smart phone, personal data assistant (PDA), one or more processors within these or other devices, or any other suitable processing device. For example, each client 186 may comprise a computer that includes an input device, such as a keypad, touch screen, mouse, or other device that can accept user information, and an output device that conveys information associated with the operation of one or more components, systems, or applications in environment 100 and their functionality and/or the client 186 itself, including digital data, visual information, or the GUI. Both the input and output device may include fixed or removable storage media such as a magnetic storage media, CD-ROM, or other suitable media, to both receive input from and provide output to users of client 186 through the display, namely, the GUI 196. The client's processor 190, interface 188, and memory 192 may be similar to or different from those described in connection with the other components illustrated in FIG. 1, although alternative implementations of one or more of these components may be used, as well as implementations where additional components may also be included. Generally, each system may be associated with one or more GUIs (not illustrated), such that users local to software provider system 102 and the partner systems 136 can access the functionality of the corresponding local component, as well as the remote functionality of the other illustrated components via network 168.

FIG. 2 is a diagram 200 illustrating example actions, actors, and communications between systems within an example environment described in the present application, where the illustrated actions, actors, and communications assist in providing synchronized opportunity-related information between systems in a software sales environment. Diagram 200 provides example systems, actors, and activities performed within the system to provide synchronized opportunity information across the system. As illustrated, three participants are included in the system: the pre-sales software configuration system 205, the internal sales system 220, and the partner system 240. Alternative implementations and components may also be used, where appropriate.

Box 245 within the partner system 240 begins by updating an opportunity within the partner system 240. In some instances, the opportunity may be initially generated at box 245. The diagram 200 involves scoping and configuration operations performed at a cloud-based pre-sales software configuration application 205. Arrow 280 represents communications between an interface at the partner system 240 and an interface at the pre-sales software configuration application 205 allowing opportunity information to be shared across system borders and between components. Box 225 within the internal sales system 220 of the software provider illustrates where opportunities are created, modified, and/or updated within the internal sales system 220. Those opportunities, which may overlap with or be different from those provided from box 245, are also sent to the pre-sales software configuration application 205. Opportunities and opportunity information can be created independently within both the internal sales system 220 and the partner system 240, although in many instances, opportunities in the two systems may overlap. This overlap may provide each system with two different subsets of information associated with a particular opportunity and/or prospective customer, such that neither system contains a complete set of information. When a particular opportunity is associated with an instance of the pre-sales software configuration application 205, information from both systems can be identified and/or obtained.

As illustrated at box 210, a solution advisor or sales representative from either or both of the systems can work with a prospective customer to determine the scope and configuration of a particular application or solution to be implemented. In many instances, this process can include various questionnaires, interviews, discussions, and interactions between the prospective customer and the sales staff of the partner system. Opportunity information associated with the prospective customer can be updated at this time. At box 215, an updated and agreed upon scope of the solution may be determined at the pre-sales configuration application 205. Typically, opportunity and sales information from this process can be provided back to the internal sales system 220 of the software provider. The present solution adds the communication of arrow 284, where the updated scoping and opportunity information derived in the pre-sales software configuration application 205 are provided to the partner system 240 to update the partner's internal records and data regarding the opportunity as a whole, as well as the particular solution to be implemented through the current process. At box 250, the partner system 240 can update the opportunity information based on the data received from arrow 284 via the partner system's interface to the pre-sales software configuration application 205, which can include opportunity information previously only included within the internal sales system 220 that was shared with the pre-sales software configuration application 205. As illustrated by arrow 280, additional opportunity information updates can be shared with the internal sales system 220.

Box 230, which can occur concurrently, sequentially, or at any suitable time in relation to box 250 and the communication represented by arrow 284, can update the opportunity information within the internal sales system 220 based on the combined opportunity information within the pre-sales software configuration application 205. As described, this can include opportunity information received from the partner system 240, providing the internal sales system 220 a more complete record of the current opportunity information, and synchronizing the two system's data sets. At box 235, an order associated with the configuration information and opportunity information can be triggered. In some instances, this may be performed concurrently or sequentially with a contract and/or order being entered or created within the partner system 240 (box 260). Contracts between the partner and the software provider can be created elsewhere based on the reselling of the software provider's software systems.

FIG. 3 is a flowchart of an example method 300 for providing synchronized opportunity-related information between the pre-sales software configuration system, software provider, and a partner or reseller of the software. For clarity of presentation, the description that follows generally describes method 300 in the context of environment 100 illustrated in FIG. 1. However, it will be understood that method 300 may be performed, for example, by any other suitable system, environment, or combination of systems and environments, as appropriate.

At 305, an instance of a pre-sales software configuration application can be initiated for a particular partner system. The pre-sales software configuration application can be a cloud-based solution, with multiple instances generated for each partner system or software provider when requested. Generally, a new instance can be initiated for each prospective customer associated with the partner system or software provider. The instances may be dedicated instances associated with the corresponding partner system, providing secure means for the partner to input opportunity and configuration information. In some instances, new opportunities can be defined directly within the pre-sales software configuration application. In those instances, prior information for an opportunity about a prospective customer may not be available in one or both of the systems, and may represent new information. In those instances, the synchronization operations may serve to provide the systems where no related opportunity exists with a new opportunity and related customer information.

At 310, an opportunity associated with a sales prospect, or prospective customer, from the partner system is identified. In some instances, the opportunity may be identified in response to a request from the partner system to create an instance of the pre-sales software configuration system for defining potential systems for the prospective customer. In other instances, a user associated with the partner system may identify, from within the instance of the pre-sales software configuration application, a particular prospective customer or opportunity to work with within the application. In some instances, identifying may include actively retrieving the information from the partner system, such as through a defined interface between the systems for sharing information. In other instances, a request may be sent to the partner system with the response including at least a portion of the requested information, if the pre-sales software configuration application is authorized to view the information. In some instances, the opportunity information and customer-related data may be available within a data or business object instance stored at the partner system.

At 320, opportunity-related information from the software provider system is incorporated into the pre-sales software configuration application. The pre-sales software configuration application can include an interface for retrieving and sharing information with the software provider system. At 320, the opportunity information from the partner system associated with a particular prospect is identified, and the software provider system can be queried as to whether corresponding opportunity information is located or stored thereon. The pre-sales software configuration application can actively retrieve the related opportunity information from the software provider system or request a responsive communication that includes the relevant information. The interfaces used at 310 and 320 may include XML message-based interfaces, RFC calls, or other suitable interfaces.

At 325, at least one modification to the opportunity and its combined opportunity information within the pre-sales software configuration application instance is identified. In some instances, the modification may be based on configuration changes and modifications within the pre-sales software configuration application. In other instances, the modification may be based on additional or new information received during pre-sales activity performed at the pre-sales software configuration application. The identification of the at least one modification can be performed by an update module included within or associated with the pre-sales software configuration application. The update module can monitor the opportunity information for modification and changes. In some instances, the modification may be identified if the opportunity information from the two systems (the partner system and the software provider) are not exactly overlapping, such that the combined opportunity information represents at least a subset of opportunity information not previously available at or included in one or both of the two systems.

At 330, the updated opportunity information identified at 325 can be sent to the software provider system, where the software provider's related opportunity can be updated with the new or modified data. If no new changes were made to the opportunity information that was provided to the pre-sales software configuration application, 330 may be skipped. Similarly, at 340, the updated opportunity information identified at 325 can be sent, via the respective interface, to the partner system, where the updated information can be populated into the corresponding opportunity stored there.

The updated, and, in many situations, more complete opportunity information, can then be used by the respective systems when further action is requested by the pre-sales software configuration application. For instance, when the scoping is complete and an order is triggered, the updated opportunity information can be used as the basis of the order generated at the software provider system, as illustrated at 335. Similarly, upon scoping and configuration completion, the partner system can create a contract or order based on the updated opportunity information at 345. This shared information can allow for the further processes performed at the two systems to be based on identical, or substantially similar, sets of data and opportunity information, thereby providing enhanced agreement and symmetry between the systems.

Figure 4:
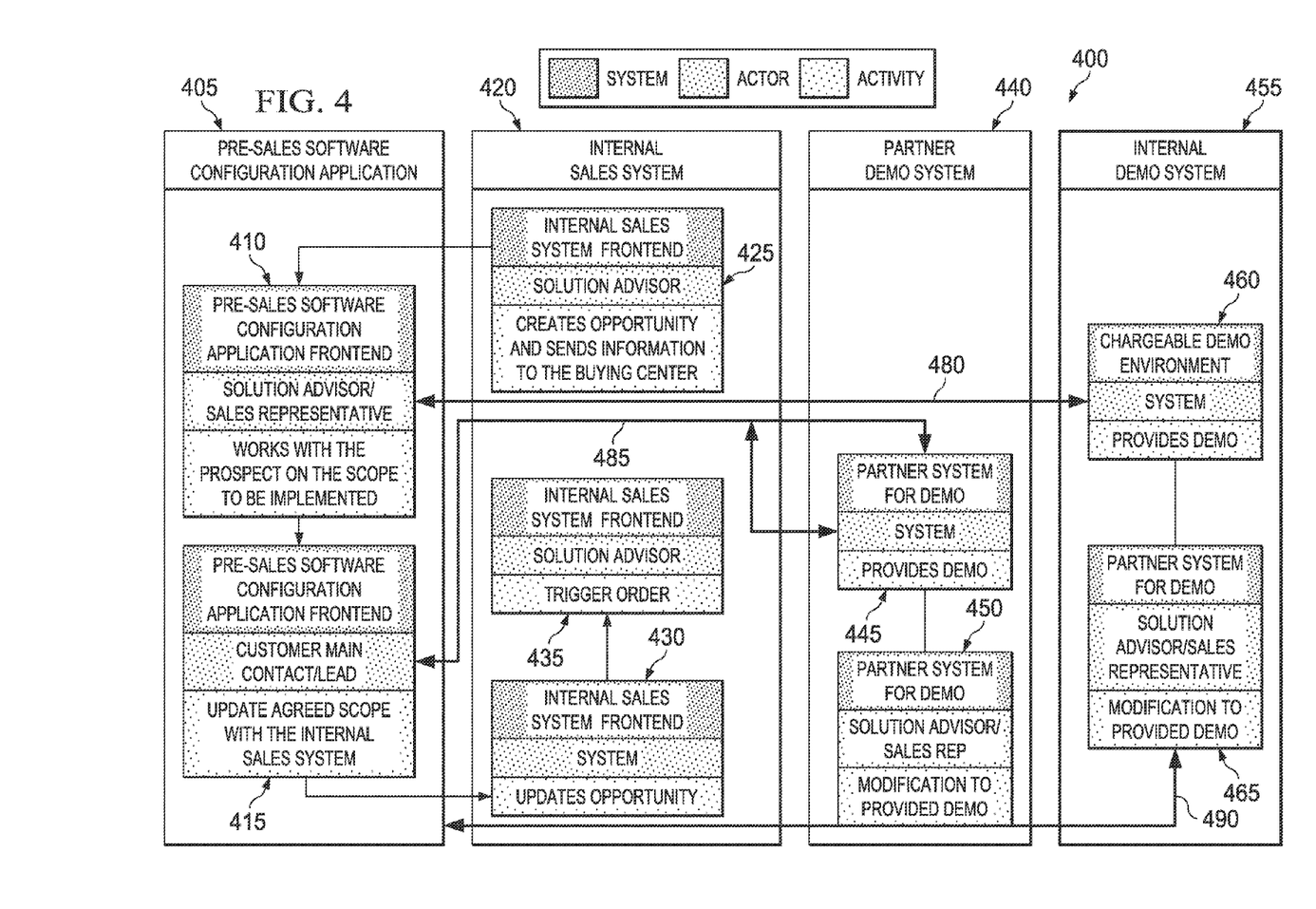
FIG. 4 is a diagram illustrating example actions, actors, and communications between systems within an example environment described in the present application, where the illustrated actions, actors, and communications assist in providing personalized demos of software solutions configured in the pre-sales software configuration system.

FIG. 4 is a diagram 400 illustrating example actions, actors, and communications between systems within an example environment described in the present application, where the illustrated actions, actors, and communications assist in providing personalized demos of software solutions configured in the pre-sales software configuration system. Diagram 400 provides example systems, actors, and activities performed within the system to provide personalized demo environments within a partner demo system 440 or a software provider internal demo system 455 based on configuration information defined within a pre-sales software configuration application 405. At least a subset of information related to a prospective customer is provided from an internal sales system 420. In some instances, prospective customer information may also be provided by or identified from within a partner system (not illustrated). Alternative implementations and components may also be used, where appropriate.

As illustrated in box 425, an opportunity associated with a prospective customer can be created and/or identified within the internal sales system 420 of the software provider system. While not illustrated, the opportunity information could also be created and/or identified from a relevant partner system, such as the partner system 240 illustrated in FIG. 2. Information associated with the opportunity can be provided to the pre-sales software configuration application 405, allowing a sales representative of either the partner or the software provider to work with the prospective customer to identify the appropriate scoping and configuration requirements associated with the desired or needed software solution at box 410.

In the present solution, the prospective customer may wish to view and/or interact with a demo environment representing at least a portion of the options, components, and functionality defined during the scoping operations, but prior to completing an order or purchase. Using interfaces available between the pre-sales software configuration application 405 and one or both of the partner demo system 440 and the internal demo system 455 of the software provider (or a software provider system), information defined within the pre-sales software configuration application 405 can be provided to the appropriate demo system (as illustrated by arrow 480) so that a representative demo environment can be generated. The information provided to the appropriate demo system may include a set of configuration information defined within the pre-sales software configuration application 405, as well as a subset of opportunity information collected at the pre-sales software configuration application 405 and derived from the partner system and the software provider system (for instance, as described in FIG. 2). The appropriate demo system may be determined based on any relevant factors, criteria, or indication, including, but not limited to, a specific request for the demo to be generated within a particular environment, the particular association of the sales representative working in the pre-sales software configuration application 405 to one of the demo systems (e.g., a user associated with a partner system would use the partner demo system), and the particular functionality available at the involved systems. In some instances, the demo environment can be automatically created in response to completion of a set of configuration data and/or opportunity data within the pre-sales software configuration application 405, as well as based upon reaching predefined intervals within the scoping process.

At box 445, a demo environment is generated within and/or provided by the partner demo system 440 based, at least in part, on information defined during the scoping and configuration process at the pre-sales software configuration application 405. The partner demo system 440 can provide a demo environment that presents an example presentation of a software environment that reflects the selections made during the scoping operations at the pre-sales software configuration application 405. Additionally, data used for operations within the demo environment can include at least a portion of the opportunity data available from the pre-sales software configuration application 405 (such as that collected from the partner system and the software provider system). Additionally, the partner demo system 440 can include some generic master data for at least a portion of the demo environment, as needed. In some instances, the generated demo environment may include one or more editable or modifiable components, functionality, or options. Where any of those elements or options are edited or modified within the demo environment, the demo environment can identify those changes (in box 450). The changes can be returned to the pre-sales software configuration application 405 using the interface available at the partner system (as illustrated by arrow 485), where those changes modify the scoping and configuration options defined at the pre-sales software configuration application 405. Those changes can be reflected in any further scoping operations, and used to complete the scoping process.

Similar to the operations of boxes 445 and 450, the internal demo system 455 can generate or provide a demo environment (box 460), where the demo environment is modifiable or editable based on further interaction. Any modifications in the demo environment can be identified (box 465) and returned to the pre-sales software configuration application 405 (arrow 490), as described above.

At box 415, the scoping operations can continue, based on the revised set of configurations due to any changes made within the demo environments, until an agreed upon scoping and configuration is completed. In some instances, multiple generations of the demo environment may be performed to provide the prospective customer with multiple opportunities to review and revise the scoping and configuration. Once complete, the agreed scoping and configuration information can be provided to the internal sales system 420, where the opportunity information can be updated based on the completed scoping (at box 430), and, in some instances, an order for a software solution matching the defined scoping and configuration information can be generated at box 435. Operations similar to those illustrated in box 260 of the partner system 240 in FIG. 2 (not illustrated in FIG. 4) can also be performed.

Figure 5:
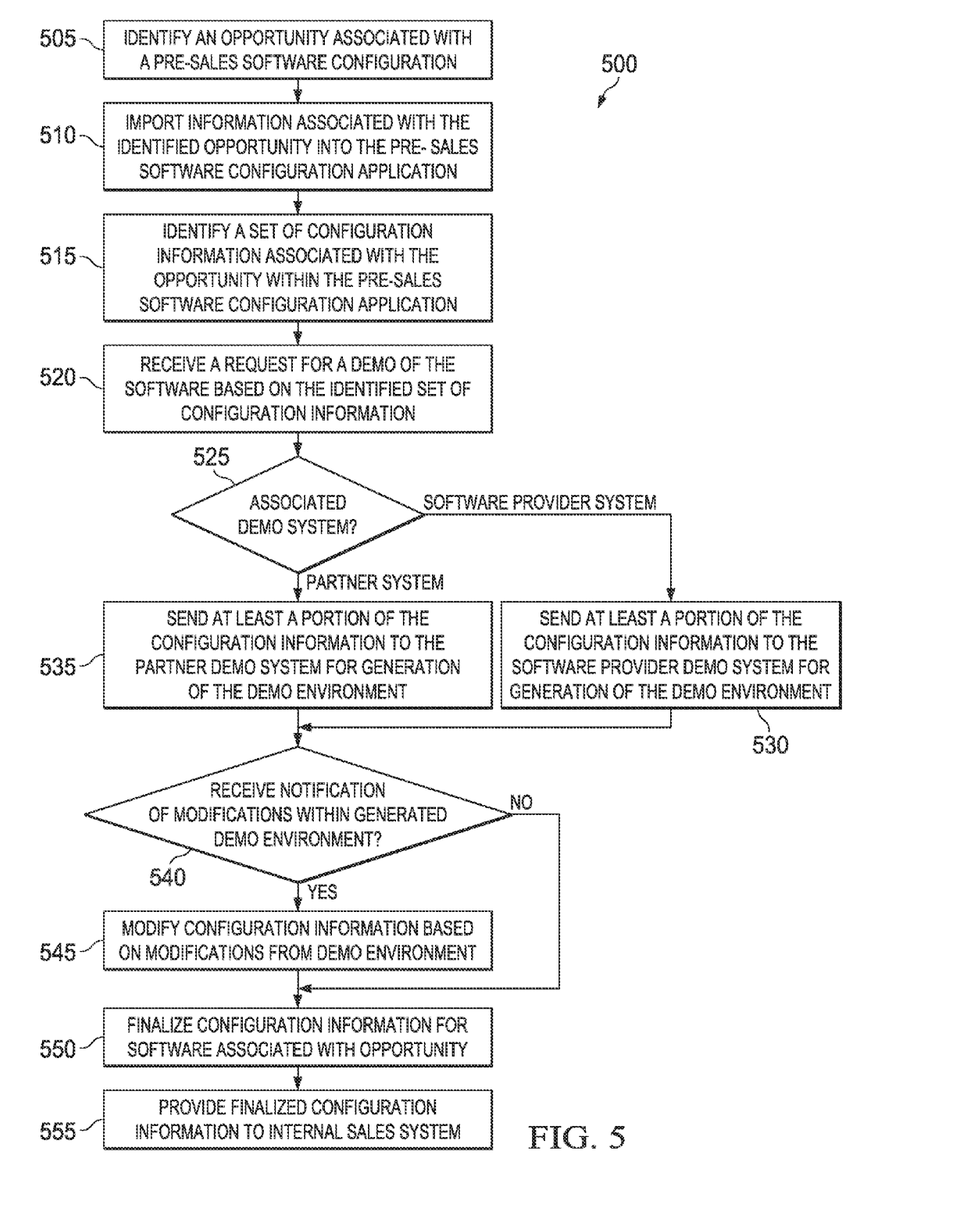
FIG. 5 is a flowchart of an example method for providing personalized demos of software solutions configured in the pre-sales software configuration system.

FIG. 5 is a flowchart of an example method 500 for providing personalized demos of software solutions configured in the pre-sales software configuration system. For clarity of presentation, the description that follows generally describes method 500 in the context of environment 100 illustrated in FIG. 1. However, it will be understood that method 500 may be performed, for example, by any other suitable system, environment, or combination of systems and environments, as appropriate.

At 505, an opportunity associated with a pre-sales software configuration application is identified. The identified opportunity can be associated with a partner or reseller system or a software provider system, such as those described in FIGS. 1 through 4. In some instances, the opportunity can be identified based on pre-sales activity associated with a particular prospective customer, such as a customer involved in scoping and planning operations for one or more software solutions. At 510, information associated with the identified opportunity can be imported into the pre-sales software configuration application. That opportunity information can be imported or obtained from a partner system, a software provider system, or another system with prior opportunity information associated with the prospective customer available. In some instances, the imported information may be a combination of opportunity information from various systems, including the partner system and the software provider system. In some instances, some of the opportunity information may be acquired or identified based on interactions within the pre-sales software configuration application itself.

At 515, a set of configuration information associated with the identified opportunity is identified within the pre-sales software configuration application. In some instances, at least a portion of the configuration information may be available at systems other than the pre-sales software configuration application, such as the partner system or the solution provider system, where prior configuration and scoping sessions have been saved with the respective sets of opportunity information. The set of configuration information can be further identified based on a current scoping session and process performed at or via the pre-sales software configuration application, where a sales representative associated with the pre-sales software configuration application can work with a representative of the prospective customer to define the configurations, scoping, and options for a particular software solution.

At 520, a request for a demo of the scoped software solution may be received, where the demo is to be based on the current set of configuration and scoping information available, at least in part, at the pre-sales software configuration application. In some instances, a GUI associated with the pre-sales software configuration application may provide a button or other interactive element that can be used to submit the request. In some instances, providing the demo may be a part of the scoping operations, such that a request is received after one or more scoping milestones are reached. Once the request is received, a determination as to the appropriate system in which to generate the demo is made at 525. In some instances, including that illustrated in FIG. 5, the options may be a partner demo system (hosted by the partner) or a software demo system (hosted by the software provider). In some implementations, only one option may be available, such that the determination at 525 is moot. In other implementations, more or alternative options than those illustrated may be available. Generally, the determination as to the appropriate demo system in which the demo environment is to be provided can be based on any suitable criteria or determinations, including, but not limited to, specific requests for the demo to be generated within a particular system, an association of the sales representative working in the pre-sales software configuration application to one of the available demo systems, or the particular functionality available, among others.

In the illustrated method 500, the two demo system options are the demo systems of the software provider system and the partner system. In either instance, at least a subset of the configuration information from the pre-sales software configuration application can be sent to the appropriate system (at 530 and 535) via one or more interfaces between the systems, with the configuration information being used to generate a suitable demo environment meeting at least a subset of the scoping and configuration information defined within the pre-sales software configuration application.

At 540, when the respective demo is complete, a determination is made as to whether a notification of modifications performed within the demo environment is received. The demo systems, in some instances, may provide editable or modifiable demo environments, where changes to options, scoping, and configuration data can be made and reflected within the pre-sales software configuration application's scoping and configuration information. Information about those modifications can be sent back to the pre-sales software configuration application when they are made in the demo environment, either immediately while the demo is available or at the end of the demo session. If modifications are made and a corresponding notification is received, method 500 moves to 545, where the configuration information in the pre-sales software configuration application is updated based on the modifications identified from within the demo environment. This information, once modified in the pre-sales software configuration application, can be synchronized across systems connected to or associated with the pre-sales software configuration application. In some instances, multiple demo instances can be initiated through the pre-sales software configuration application, allowing prospective customers to iteratively review modifications to the configuration and scoping information. If, on the other hand, no notification of modifications is received, method 500 continues at 550. At 550, the configuration information for the scoped software solution can be finalized. The finalized configuration information can then be provided to an internal sales system (and the partner system, if appropriate) at 555 to effect the sale and generation of the actual software solution defined within the pre-sales software configuration application. In some instances, no sale may result from the scoping and configuration operations. In those instances, the scoping information can be stored as opportunity information within the appropriate system and available for later use or further scoping and configuration, as well as future sales.

The preceding figures and accompanying description illustrate example processes and computer-implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method performed by one or more processors for synchronizing opportunity information in a software-related sales environment, the method comprising:

identifying, at a software configuration application associated with a prospective customer, a first set of opportunity information from a software reseller and a second set of opportunity information from a software provider, the first and second set of opportunity information associated with the prospective software customer, wherein the first set of opportunity information includes at least a subset of opportunity information not included in the second set of opportunity information;

integrating the first and second set of opportunity information into a combined set of opportunity information within the software configuration application for use in configuring a particular software solution for the prospective customer, wherein the combined set of opportunity information represents a third set of opportunity information different than the first and second sets of opportunity information;

identifying at least one modification to the third set of opportunity information occurring after integration of the first and second set of opportunity information and as a result of additional configurations to the particular software solution via the software configuration application; and synchronizing the first set of opportunity information stored at the software reseller and the second set of opportunity information stored at the software provider by replacing the first and second set of opportunity information with the third set of opportunity information including the at least one identified modification.

2. The method of claim 1, wherein the software configuration application comprises a cloud-based system for configuring at least one software solution provided, at least in part, by the software provider.

3. The method of claim 1, wherein the first set of opportunity information includes at least a subset of opportunity information not included in the second set of opportunity information.

4. The method of claim 1, wherein the first set of opportunity information from the software reseller includes at least one of the following:

a set of configuration information for a software solution previously defined via the software configuration application; and master data associated with the prospective software customer.

5. The method of claim 1, wherein identifying the first set of opportunity information from the software reseller and the second set of opportunity information from the software provider includes:

connecting to a system associated with the software reseller via a first interface of the software configuration application to retrieve the first set of opportunity information; and connecting to a system associated with the software provider via a second interface of the software configuration application to retrieve the second set of opportunity information.

6. The method of claim 5, wherein synchronizing the first set of opportunity information stored at the software reseller and the second set of opportunity information stored at the software provider includes:

connecting to the system associated with the software reseller via the first interface of the software configuration application to update the first set of opportunity information to correspond to the third set of opportunity information; and connecting to the system associated with the software provider via the second interface of the software configuration application to update the second set of opportunity information to correspond to the third set of opportunity information.

7. A computer program product for synchronizing opportunity information in a software-related sales environment, the computer program product comprising computer readable instructions embodied on tangible, non-transitory media, the instructions operable when executed to:

identify, at a software configuration application associated with a prospective customer, a first set of opportunity information from a software reseller and a second set of opportunity information from a software provider, the first and second set of opportunity information associated with the prospective software customer, wherein the first set of opportunity information includes at least a subset of opportunity information not included in the second set of opportunity information;

integrate the first and second set of opportunity information into a combined set of opportunity information within the software configuration application for use in configuring a particular software solution for the prospective customer, wherein the combined set of opportunity information generates a third set of opportunity information different than the first and second sets of opportunity information;

identify at least one modification to the third set of opportunity information occurring after integration of the first and second set of opportunity information and as a result of additional configurations to the particular software solution via the software configuration application; and synchronize the first set of opportunity information stored at the software reseller and the second set of opportunity information stored at the software provider by replacing the first and second set of opportunity information with the third set of opportunity information including the at least one identified modification.

8. The computer program product of claim 7, wherein the software configuration application comprises a cloud-based system for configuring at least one software solution provided, at least in part, by the software provider.

9. The computer program product of claim 7, wherein the first set of opportunity information includes at least a subset of opportunity information not included in the second set of opportunity information.

10. The computer program product of claim 7, wherein the first set of opportunity information from the software reseller includes at least one of the following:

a set of configuration information for a software solution previously defined via the software configuration application; and master data associated with the prospective software customer.

11. The computer program product of claim 7, wherein identifying the first set of opportunity information from the software reseller and the second set of opportunity information from the software provider includes:

connecting to a system associated with the software reseller via a first interface of the software configuration application to retrieve the first set of opportunity information; and connecting to a system associated with the software provider via a second interface of the software configuration application to retrieve the second set of opportunity information.

12. The computer program product of claim 11, wherein synchronizing the first set of opportunity information stored at the software reseller and the second set of opportunity information stored at the software provider includes:

connecting to the system associated with the software reseller via the first interface of the software configuration application to update the first set of opportunity information to correspond to the third set of opportunity information; and connecting to the system associated with the software provider via the second interface of the software configuration application to update the second set of opportunity information to correspond to the third set of opportunity information.

13. A system comprising:

one or more computers; and a computer-readable medium coupled to the one or more computers having instructions stored thereon which, when executed by the one or more computers, cause the one or more computers to perform operations comprising:

identifying a first set of opportunity information from a software reseller and a second set of opportunity information from a software provider, the first and second set of opportunity information associated with a prospective software customer, wherein the first set of opportunity information includes at least a subset of opportunity information not included in the second set of opportunity information;

integrating the first and second set of opportunity information into a combined set of opportunity information for use in configuring a particular software solution for the prospective customer, wherein the combined set of opportunity information generates a third set of opportunity information different than the first and second sets of opportunity information;

identifying at least one modification to the third set of opportunity information occurring after integration of the first and second set of opportunity information and as a result of additional configurations to the particular software solution; and synchronizing the first set of opportunity information stored at the software reseller and the second set of opportunity information stored at the software provider by replacing the first and second set of opportunity information with the third set of opportunity information including the at least one identified modification.

14. The system of claim 13, wherein the first set of opportunity information includes at least a subset of opportunity information not included in the second set of opportunity information.

15. The system of claim 13, wherein identifying the first set of opportunity information from the software reseller and the second set of opportunity information from the software provider includes:

connecting to a system associated with the software reseller via a first interface to retrieve the first set of opportunity information; and connecting to a system associated with the software provider via a second interface to retrieve the second set of opportunity information.

\* \* \* \* \*